United States Patent
Lin et al.

(10) Patent No.: US 10,247,550 B2
(45) Date of Patent: Apr. 2, 2019

(54) MOBILE DEVICES AND METHODS FOR DETERMINING ORIENTATION INFORMATION THEREOF

(71) Applicant: VIA Alliance Semiconductor Co., Ltd., Shanghai (CN)

(72) Inventors: Xia Lin, Shanghai (CN); Dongxing Wu, Shanghai (CN); Deming Gu, Shanghai (CN); Yang Mao, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 222 days.

(21) Appl. No.: 15/366,090

(22) Filed: Dec. 1, 2016

(65) Prior Publication Data

US 2018/0135977 A1    May 17, 2018

(30) Foreign Application Priority Data

Nov. 17, 2016    (CN) .......................... 2016 1 1012270

(51) Int. Cl.
*G01B 21/22* (2006.01)
*G01C 21/16* (2006.01)

(52) U.S. Cl.
CPC .......... *G01B 21/22* (2013.01); *G01C 21/165* (2013.01)

(58) Field of Classification Search
CPC .................................................. G01B 21/22
See application file for complete search history.

(56) References Cited

U.S. PATENT DOCUMENTS

| | | | |
|---|---|---|---|
| 6,725,173 B2 | 4/2004 | An et al. | |
| 7,418,364 B1 | 8/2008 | Horton et al. | |
| 8,626,465 B2 | 1/2014 | Moore et al. | |
| 8,645,063 B2 * | 2/2014 | Fortier | G01C 21/16 701/400 |
| 2011/0285590 A1 * | 11/2011 | Wellington | G01C 21/20 342/417 |

(Continued)

FOREIGN PATENT DOCUMENTS

| CN | 102822626 A | 12/2012 |
|---|---|---|
| CN | 103354728 A | 10/2013 |

OTHER PUBLICATIONS

Chinese language Notice of Allowance dated Mar. 16, 2017, issued in application No. TW 105138586.

*Primary Examiner* — Manuel A Rivera Vargas
(74) *Attorney, Agent, or Firm* — McClure, Qualey & Rodack, LLP

(57) ABSTRACT

A mobile device including an acceleration sensor, a magneto sensor, a gyroscope sensor, and a processor is provided. The acceleration sensor, the magneto sensor, and the gyroscope sensor generate acceleration data, magnetic field data, and angular velocity data, respectively. The processor determines a pitch angle and a roll angle according to the acceleration data, determines a yaw angle according to the magnetic field data, and determines a quaternion according to the pitch angle, the roll angle, and the yaw angle. Also, the processor determines orientation information of the mobile device according to the quaternion and the angular velocity data, and adjusts the orientation information according to the acceleration data and the magnetic field data.

16 Claims, 6 Drawing Sheets

(56) References Cited

U.S. PATENT DOCUMENTS

2012/0086438 A1* 4/2012 Tu ..................... G01R 33/0035
                                                  324/202
2013/0185018 A1    7/2013  Sheng
2013/0289932 A1   10/2013  Baechler
2017/0195834 A1*  7/2017   Na ....................... G01S 5/0252

* cited by examiner

MOBILE DEVICES AND METHODS FOR DETERMINING ORIENTATION INFORMATION THEREOF

CROSS REFERENCE TO RELATED APPLICATIONS

This Application claims priority of China Application No. 201611012270.X, filed on Nov. 17, 2016, and the entirety of which is incorporated by reference herein.

BACKGROUND OF THE APPLICATION

Field of the Application

The application relates generally to the techniques for obtaining orientation information of mobile devices, and more particularly, to determining orientation information by the integration of data generated from various kinds of sensors equipped within the mobile devices.

Description of the Related Art

With the growing popularity of mobile devices, motion-sensing technologies have become one of the key developmental fields in recent years. More and more applications may obtain the orientation information of the mobile devices via the built-in sensors, which enable the applications to provide a more intelligent and user-friendly Man-Machine Interface (MMI). In addition to the field of gaming development, the applications may also be applied to various fields, including indoor/outdoor navigation, medical treatment, and indoor touring, etc.

In a conventional design, a mobile device only includes a main processor and does not include an additional processor dedicated for controlling sensor operations. Inevitably, the main processor is required to stay active, even when the mobile device is in a sleep mode, to control sensor operations and obtain orientation information therefrom. As a result, there will be frequent monitoring and controlling of sensor operations for ensuring accuracy of the orientation information, and the loading and power consumption of the main processor will increase. Alternatively, for reducing loading and power consumption, the main processor may be configured to limit the frequency of controlling sensor operations. However, the accuracy of the orientation information may be sacrificed.

BRIEF SUMMARY OF THE APPLICATION

In one aspect of the application, a mobile device comprising an acceleration sensor, a magneto sensor, a gyroscope sensor, and a processor is provided. The acceleration sensor is configured to generate acceleration data. The magneto sensor is configured to generate magnetic field data. The gyroscope sensor is configured to generate angular velocity data. The processor is configured to determine a pitch angle and a roll angle according to the acceleration data, determine a yaw angle according to the magnetic field data, determine a quaternion according to the pitch angle, the roll angle, and the yaw angle, determine orientation information of the mobile device according to the quaternion and the angular velocity data, and adjust the orientation information according to the acceleration data and the magnetic field data.

In another aspect of the application, a method for a mobile device to determine orientation information thereof is provided, wherein the mobile device comprises an acceleration sensor, a magneto sensor, and a gyroscope sensor. The method comprises the steps of: determining a pitch angle and a roll angle according to acceleration data generated by the acceleration sensor; determining a yaw angle according to magnetic field data generated by the magneto sensor; determining a quaternion according to the pitch angle, the roll angle, and the yaw angle; determining orientation information of the mobile device according to the quaternion and angular velocity data generated by the gyroscope sensor; and adjusting the orientation information according to the acceleration data and the magnetic field data.

Other aspects and features of the application will become apparent to those with ordinary skill in the art upon review of the following descriptions of specific embodiments of the mobile devices and methods for determining orientation information of a mobile device.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof.

Figure 1:
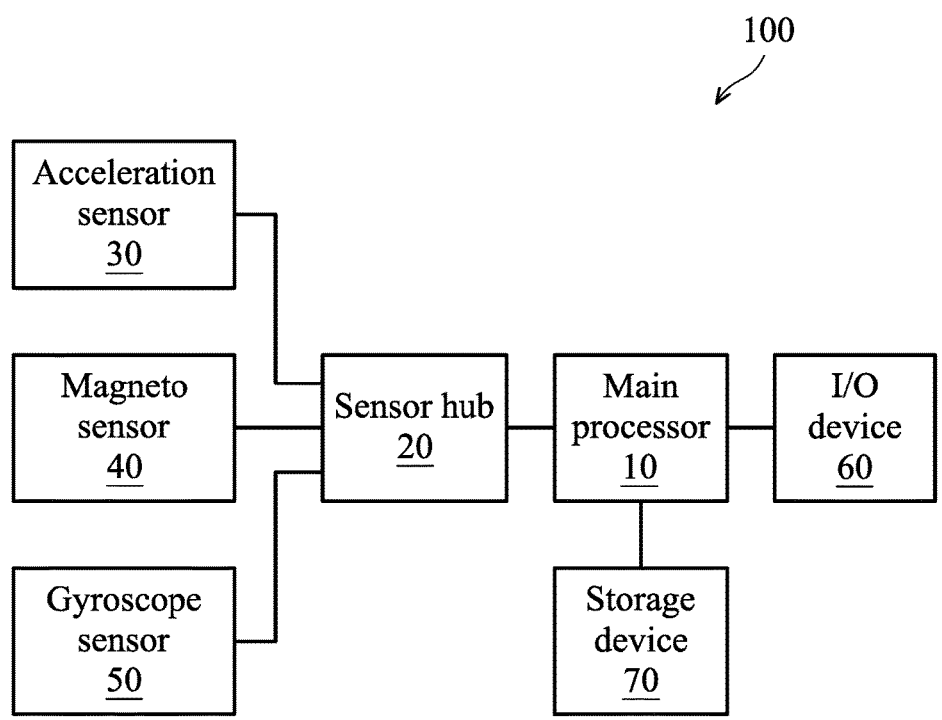
FIG. 1 is a block diagram illustrating a mobile device according to an embodiment of the application.

FIG. 1 is a block diagram illustrating a mobile device according to an embodiment of the application. The mobile device 100 includes a main processor 10, a sensor hub 20, an acceleration sensor 30, a magneto sensor 40, a gyroscope sensor 50, an Input/Output (I/O) device 60, and a storage device 70. The acceleration sensor 30, the magneto sensor 40, and the gyroscope sensor 50 are operatively coupled to the sensor hub 20. The sensor hub 20, the I/O device 60, and the storage device 70 are operatively coupled to the main processor 10.

The mobile device 100 may be a feature phone, smartphone, panel Personal Computer (PC), smart vehicle, Un-manned Aerial Vehicle (UAV), smart toy, or any mobile computing device.

The main processor 10 may be a general-purpose processor, Micro-Control Unit (MCU), Digital Signal Processor (DSP), Application Processor (AP), or the like. Specifically, the main processor 10 performs the functions of data processing and computing, controlling the operation of the sensor hub 20, obtaining orientation information generated by the sensor hub 20, transmitting and/or receiving signals (e.g., user input signals) via the I/O device 60, and storing and/or retrieving data from the storage device 70.

The sensor hub 20 is responsible for controlling the operations, e.g., controlling the sampling rates, of the acceleration sensor 30, the magneto sensor 40, and the gyroscope sensor 50. In addition, the sensor hub 20 receives the measured data from the acceleration sensor 30, the magneto sensor 40, and the gyroscope sensor 50, and further processes the measured data to generate orientation information of the mobile device 100. It should be noted that the sensor hub 20 consumes only a relatively low level of power compared to the main processor 10.

The acceleration sensor 30 is responsible for measuring the acceleration of the mobile device 100 and generating acceleration data accordingly.

The magneto sensor 40 is responsible for measuring the change of magnetic field and generating magnetic field data accordingly.

The gyroscope sensor 50 is responsible for measuring the angular velocity of the mobile device 100 and generating angular velocity data accordingly.

In one embodiment, the acceleration sensor 30, the magneto sensor 40, and the gyroscope sensor 50 may each comprise one or more hardware components to realize, electrically, mechanically, or capacitively, the measurement of acceleration, magnetic field, or angular velocity.

The I/O device 60 may include one or more buttons, a keyboard, a mouse, a touch pad, a video camera, a microphone, a display (e.g., Liquid-Crystal Display (LCD), Light-Emitting Diode (LED) display, or Electronic Paper Display (EPD), etc.), and/or a speaker, etc., serving as the Man-Machine Interface (MMI) for interaction with users.

The storage device 70 is a non-transitory machine-readable storage medium, such as a memory, (e.g., a FLASH memory or a Non-volatile Random Access Memory (NVRAM)), or a magnetic storage device, (e.g., a hard disk or a magnetic tape), or an optical disc, or any combination thereof for storing instructions and/or program code of applications or communication protocols.

It should be understood that the components described in the embodiment of FIG. 1 are for illustrative purposes only and are not intended to limit the scope of the application. For example, the mobile device 100 may further include a wireless communication device (including a baseband processing device, an RF device, and an antenna) for providing the function of wireless communication, a power supply, and/or a Global Positioning System (GPS).

Figure 2:
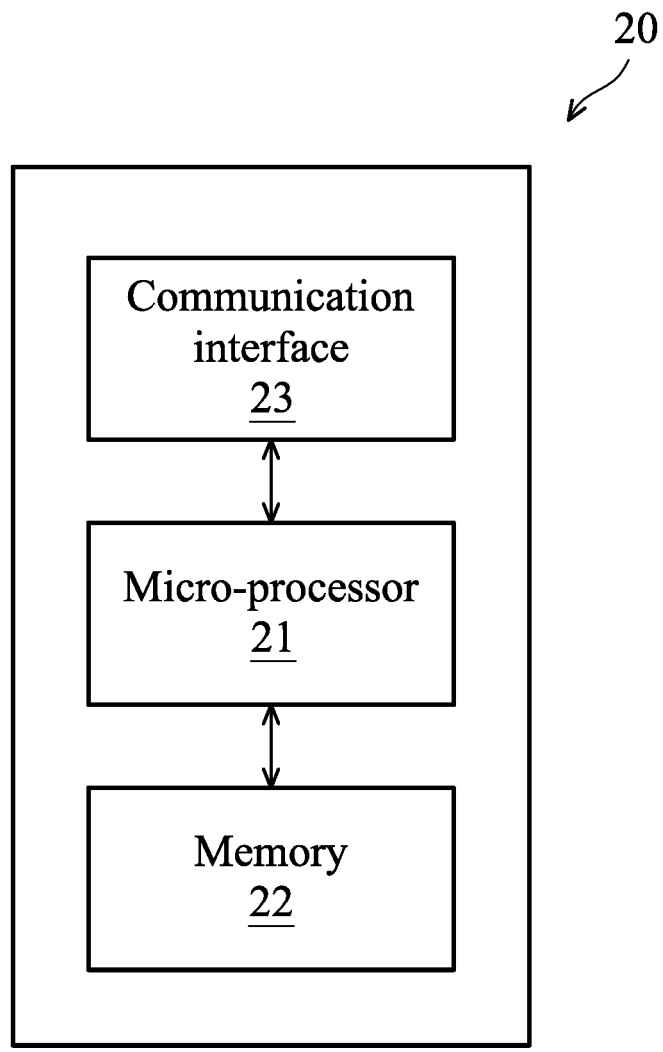
FIG. 2 is a block diagram illustrating the sensor hub 20 according to the embodiment of FIG. 1.

FIG. 2 is a block diagram illustrating the sensor hub 20 according to the embodiment of FIG. 1. The sensor hub 20 includes a micro-processor 21, a memory 22, and a communication interface 23. The memory 22 and the communication interface 23 are operatively coupled to the micro-processor 21. The sensor hub 20 is operatively coupled to the main processor 10, the acceleration sensor 30, the magneto sensor 40, and the gyroscope sensor 50 via the communication interface 23.

The micro-processor 21 may be an MCU and may include various circuits for controlling operations of the acceleration sensor 30, the magneto sensor 40, and the gyroscope sensor 50 via the communication interface 23, processing the data obtained from the sensors to determine the orientation information of the mobile device 100, and reading or writing data from or to the memory 22. In particular, the micro-processor 21 is responsible for controlling the operations of the acceleration sensor 30, the magneto sensor 40, and the gyroscope sensor 50, to perform the method for determining orientation information of the mobile device 100.

As will be appreciated by persons skilled in the art, the circuitry in the micro-processor 21 will typically include transistors that are configured in such a way as to control the operation of the circuitry in accordance with the functions and operations described herein. As will be further appreciated, the specific structure or interconnections of the transistors will typically be determined by a compiler, such as a register transfer language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The memory 22 is a non-transitory machine-readable storage medium, such as a FLASH memory or a NVRAM, for storing instructions or program code of method of the present application. In addition, the memory 22 stores the measured data from the acceleration sensor 30, the magneto sensor 40, and the gyroscope sensor 50, and the temporary data generated during data processing and computing.

The communication interface 23 is responsible for providing signal transmission and reception between the sensor hub 20 and the other components of the mobile device 100, including receiving measured data from the acceleration sensor 30, the magneto sensor 40, and the gyroscope sensor 50, transmitting control signals to the acceleration sensor 30, the magneto sensor 40, and the gyroscope sensor 50, receiving control signals from the main processor 10, and transmitting the orientation information of the mobile device 100 to the main processor 10.

Figure 3:
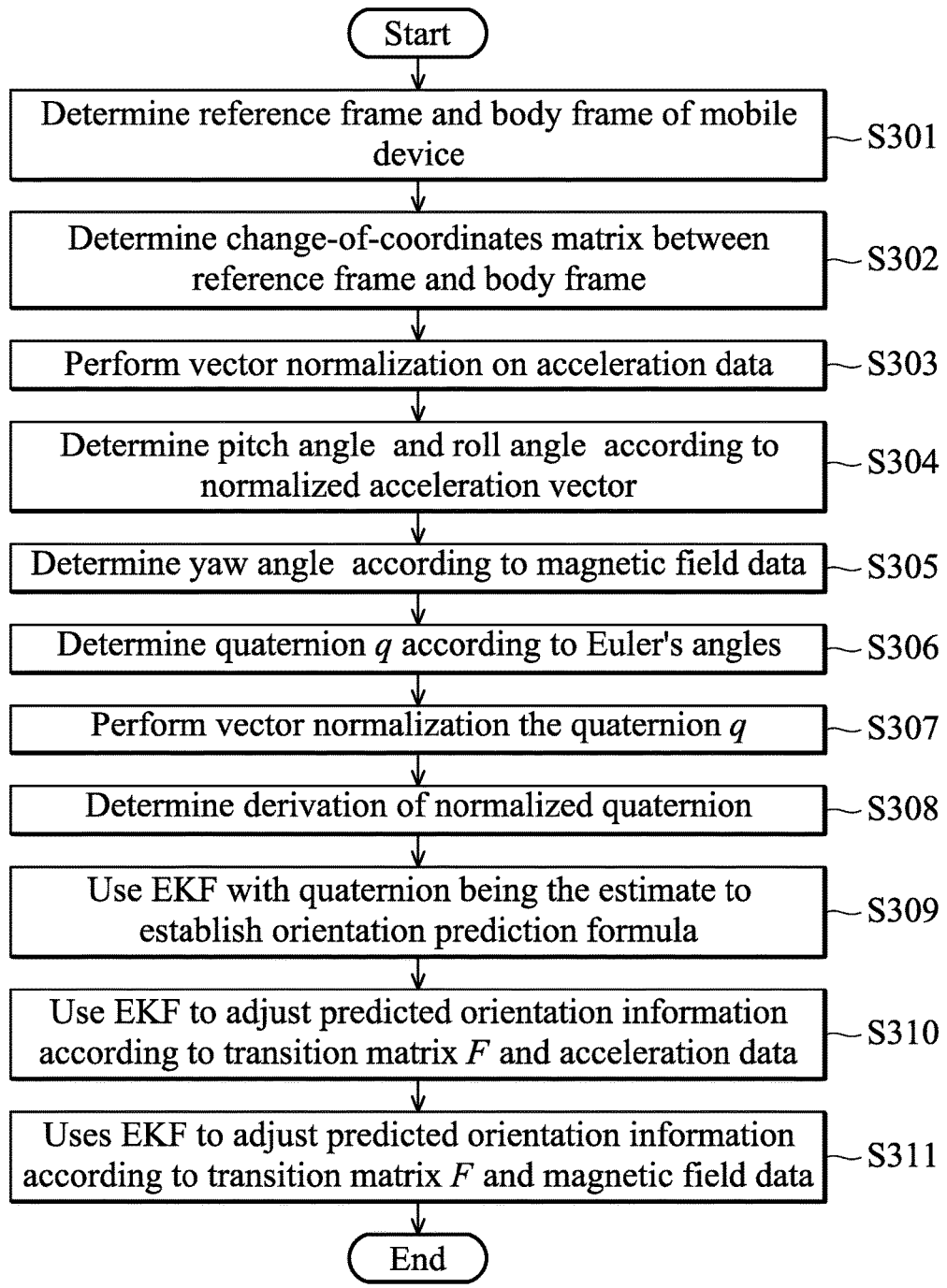
FIG. 3 is a flow chart of the method for determining orientation information of a mobile device according to an embodiment of the application.

FIG. 3 is a flow chart of the method for determining orientation information of a mobile device according to an embodiment of the application. In this embodiment, the method is applied to the mobile device 100, and is executed by the micro-processor 21 in the sensor hub 20.

Figure 4:
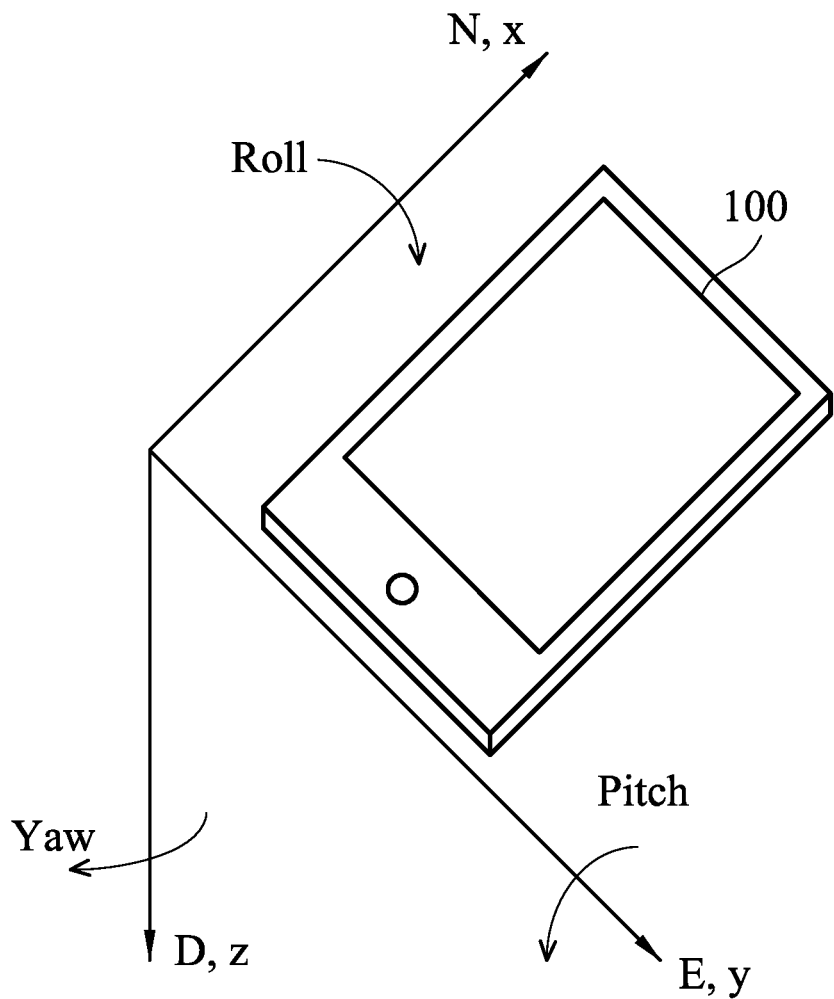
FIG. 4 is a schematic diagram illustrating the reference frame and the body frame of a mobile device according to an embodiment of the application.

In step S301, the micro-processor 21 uses the North-East-Down (NED) coordinate system as the frame of reference (or called reference frame) $O-X_n Y_n Z_n$. As shown in FIG. 4, the x-axis points to the geographical north (denoted as N), the y-axis points to the geographical east (denoted as E), and the z-axis points to the earth's core (denoted as D). In addition, the mobile device 100 lays flat on a horizontal surface, e.g., desktop, to determine the body frame $O-X_b Y_b Z_b$ of the mobile device 100. As shown in FIG. 4, the x-axis points to the front of the mobile device 100 (denoted as x), the y-axis points to the left of the mobile device 100 (denoted as y), and the z-axis points to the bottom down of the mobile device 100 (denoted as z).

In step S302, the micro-processor 21 determines a change-of-coordinates matrix between the reference frame and the body frame. Specifically, when the mobile device 100 is moved, the orientation of the mobile device 100 may be construed as the result of the mobile device 100 rotating over the z-axis, y-axis, and x-axis in sequence (denoted as Yaw, Pitch, and Roll in FIG. 4). The rotation angle over the z-axis is defined as the yaw angle $\psi$, the rotation angle over the y-axis is defined as the pitch angle $\theta$, and the rotation angle over the x-axis is defined as the roll angle $\phi$.

Based on the Euler angles (which consist of the yaw angle $\psi$, the pitch angle $\theta$, and the roll angle $\phi$), the spatial transformation from the reference frame to the body frame may be determined as follows:

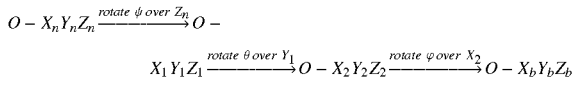

$$O-X_nY_nZ_n \xrightarrow{rotate\ \psi\ over\ Z_n} O-$$
$$X_1Y_1Z_1 \xrightarrow{rotate\ \theta\ over\ Y_1} O-X_2Y_2Z_2 \xrightarrow{rotate\ \varphi\ over\ X_2} O-X_bY_bZ_b$$

The coordinate system $O-X_1Y_1Z_1$ is determined by rotating the coordinate system $O-X_nY_nZ_n$ over the $Z_n$ axis, and the direction cosine matrix is $R_z(\psi)$. The coordinate system $O-X_2Y_2Z_2$ is determined by rotating the coordinate system $O-X_1Y_1Z_1$ over the $Y_1$ axis, and the direction cosine matrix is $R_x(\theta)$. The coordinate system $O-X_bY_bZ_b$ is determined by rotating the coordinate system $O-X_2Y_2Z_2$ over the $X_2$ axis, and the direction cosine matrix is $R_x(\phi)$.

The coordinate system $O-X_nY_nZ_n$ is the reference frame (i.e., the NED coordinate system), and the coordinate system $O-X_bY_bZ_b$ is the body frame. Based on the spatial transformation, the change-of-coordinates matrix between the reference frame and the body frame may be determined as follows using equation (1):

$$C_n^b = R_x(\phi)R_y(\theta)R_z(\psi) \quad (1)$$

Since rotation is an orthogonal transformation, the characterization for an orthogonal matrix may be represented as follows by equation (2):

$$C_b^n = (C_n^b)^{-1} = (C_n^b)^T \quad (2)$$

In equation (2), the change-of-coordinates matrix $C_b^n$ is the orientation matrix which may be represented as follows by equation (3):

$$C_b^n = \begin{bmatrix} \cos\theta\cos\psi & \sin\phi\sin\theta\cos\psi - \cos\phi\sin\psi & \cos\phi\sin\theta\cos\psi + \sin\phi\sin\psi \\ \cos\theta\sin\psi & \sin\phi\sin\theta\sin\psi + \cos\phi\cos\psi & \cos\phi\sin\theta\sin\psi - \sin\phi\cos\psi \\ -\sin\theta & \sin\phi\cos\theta & \cos\phi\cos\theta \end{bmatrix} \quad (3)$$

After determining the coordinate systems and the orientation matrix, the method proceeds to step S303, in which the micro-processor 21 performs vector normalization on the acceleration data generated by the acceleration sensor 30, and obtains the normalized acceleration vector. In one embodiment, assuming that {x, y, z} represents the vector value of the acceleration data, the vector normalization on the acceleration data may be given as follows in equation (4):

$$\left\{ \frac{x}{\sqrt{x^2+y^2+z^2}}, \frac{y}{\sqrt{x^2+y^2+z^2}}, \frac{z}{\sqrt{x^2+y^2+z^2}} \right\} \quad (4)$$

Figure 5:
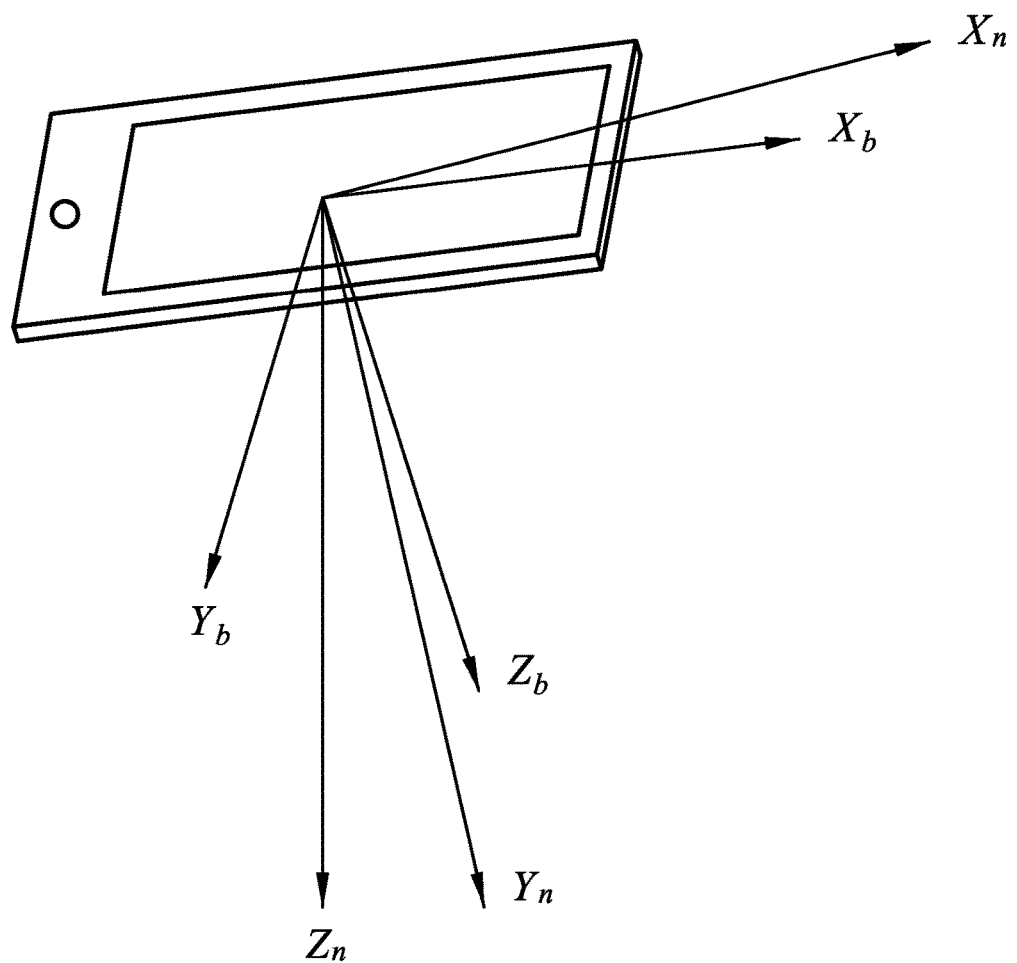
FIG. 5 is a block diagram illustrating an exemplary movement of a mobile device according to an embodiment of the application.

In step S304, the micro-processor 21 determines the pitch angle $\theta$ and the roll angle $\phi$ according to the normalized acceleration vector. An exemplary movement of the mobile device 100 is shown in FIG. 5, wherein the coordinate system $O-X_bY_bZ_b$ is the reference frame (i.e., the NED coordinate system) and the coordinate system $O-X_bY_bZ_b$ is the body frame. The pitch angle $\theta$ and the roll angle $\phi$ may be determined as follows using equation (5):

$$\begin{pmatrix} A_x \\ A_y \\ A_z \end{pmatrix} = \begin{pmatrix} \cos\theta\cos\psi & \cos\theta\sin\psi & -\sin\theta \\ \sin\phi\sin\theta\sin\psi - \cos\phi\sin\psi & \cos\phi\cos\psi + \sin\theta\sin\phi\sin\psi & \cos\theta\sin\phi \\ \cos\phi\sin\theta\cos\psi + \sin\phi\sin\psi & \cos\phi\sin\theta\sin\psi - \cos\phi\sin\phi & \cos\theta\cos\phi \end{pmatrix} \begin{pmatrix} 0 \\ 0 \\ 1 \end{pmatrix} \quad (5)$$

In equation (5), $[A_x, A_y, A_z]^T$ represents the normalized acceleration vector.

Figure 6:
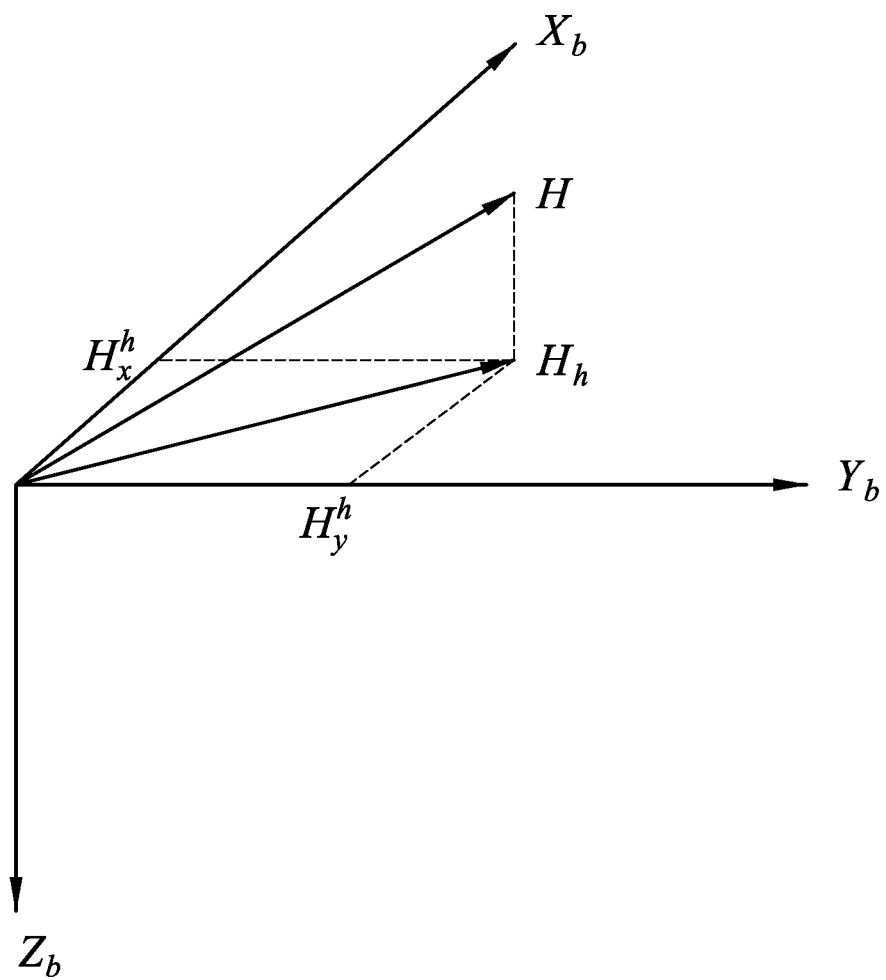
FIG. 6 is a block diagram illustrating an exemplary measurement of the magnetic field on a mobile device according to an embodiment of the application.

In step S305, the micro-processor 21 determines the yaw angle $\psi$ according to the magnetic field data generated by the magneto sensor 40. An exemplary measurement of the magnetic field on the mobile device 100 is shown in FIG. 6, wherein $H_x^h$ and $H_y^h$ represent the components of the magnetic field on the x-axis and y-axis, respectively. The relationship between the orientation matrix and the magnetic field measured by the magneto sensor 40 on the three axes may be given as follows in equation (6):

$$\begin{pmatrix} H_x^h \\ H_y^h \\ H_z^h \end{pmatrix} = C_b^h \begin{pmatrix} H_x^b \\ H_y^b \\ H_z^b \end{pmatrix} = R_x(\phi)R_y(\theta) \begin{pmatrix} H_x^b \\ H_y^b \\ H_z^b \end{pmatrix} \quad (6)$$

Based on equation (6), it may be determined that $\psi=\arctan(H_y^h/H_x^h)$.

In step S306, the micro-processor 21 determines the quaternion q according to the Euler's angles obtained from steps S304 and S305, wherein $q=[q_0, q_1, q_2, q_3]^T$ and $q_0, q_1, q_2, q_3$ may be determined as follows using equation (7):

$$q_0 = \cos\frac{\phi}{2}\cos\frac{\theta}{2}\cos\frac{\psi}{2} + \sin\frac{\phi}{2}\sin\frac{\theta}{2}\sin\frac{\psi}{2}$$
$$q_1 = \sin\frac{\phi}{2}\cos\frac{\theta}{2}\cos\frac{\psi}{2} - \cos\frac{\phi}{2}\sin\frac{\theta}{2}\sin\frac{\psi}{2}$$
$$q_2 = \cos\frac{\phi}{2}\sin\frac{\theta}{2}\cos\frac{\psi}{2} + \sin\frac{\phi}{2}\cos\frac{\theta}{2}\sin\frac{\psi}{2}$$
$$q_3 = \cos\frac{\phi}{2}\cos\frac{\theta}{2}\sin\frac{\psi}{2} - \sin\frac{\phi}{2}\sin\frac{\theta}{2}\cos\frac{\psi}{2}$$
$$(7)$$

In step S307, the micro-processor 21 performs vector normalization on the quaternion q and obtains normalized quaternion Q. In one embodiment, the vector normalization on the quaternion q may be given as follows in equation (8):

$$\left[ \frac{q_0}{\sqrt{q_0^2+q_1^2+q_2^2+q_3^2}}, \frac{q_1}{\sqrt{q_0^2+q_1^2+q_2^2+q_3^2}}, \frac{q_2}{\sqrt{q_0^2+q_1^2+q_2^2+q_3^2}}, \frac{q_3}{\sqrt{q_0^2+q_1^2+q_2^2+q_3^2}} \right]^T \quad (8)$$

In step S308, the micro-processor 21 determines the derivation of the normalized quaternion Q as follows using equation (9):

$$\frac{dQ}{dt} = \frac{1}{2}\vec{w^b} \otimes Q = \frac{1}{2}Q \otimes \vec{w^b} = \qquad(9)$$

$$\frac{1}{2}M'(w^b)Q = \frac{1}{2}\begin{pmatrix} 0 & -w_x & -w_y & -w_z \\ w_x & 0 & w_z & -w_y \\ w_y & -w_z & 0 & w_x \\ w_z & w_y & -w_x & 0 \end{pmatrix} \cdot \begin{pmatrix} q_0 \\ q_1 \\ q_2 \\ q_3 \end{pmatrix} = \Omega_b \cdot Q$$

In equation (9), w represents the angular velocity measured by the gyroscope sensor 50, and Q represents the normalized quaternion obtained from step S307. Based on equation (9), the following equation (10) may be determined:

$$Q(t_{k+1}) = e^{\frac{1}{2}\int_{t_k}^{t_{k+1}} M'(w^b)dt} \cdot Q(t_k) \qquad(10)$$

Subsequently, the Taylor's expansion is applied to equation (10) to derive the update formula for the quaternion, which is the transition matrix of the Extended Kalman Filter (EKF).

In step S309, the micro-processor 21 uses the EKF with the quaternion being the estimate to establish the orientation prediction formula as follows in equation (11):

$$x_t^- = F x_{t-1}^-$$

$$P_t^- = F P_{t-1} F^T + Q \qquad(11)$$

In equation (11), F represents the transition matrix obtained in step S308, $x_t^-$ represents the predicted orientation $(q_0, q_1, q_2, q_3)$ at the current time instant, represents the best estimate using the quaternion at the last time instant, $P_{t-1}$ represents the covariance matrix at the last time instant, $P_t^-$ represents the predicted covariance matrix at the current time instant, and Q represents the noise covariance matrix introduced by the prediction formula. The value of Q is adjustable depending on the sensors and the application scenarios. An exemplary value of Q may be $10^{-4}$. Namely, the predicted orientation information of the mobile device 100 may be determined using equation (11).

In step S310, the micro-processor 21 uses the EKF to adjust the predicted orientation information, which is obtained in step S309, according to the transition matrix F and the acceleration data generated by the acceleration sensor 30. Specifically, the estimation formula is as follows in equation (12):

$$\begin{pmatrix} A_x \\ A_y \\ A_z \end{pmatrix} = z_t = h(x_t^-) = \begin{pmatrix} C_{02} \\ C_{12} \\ C_{22} \end{pmatrix} \qquad(12)$$

In equation (12), $(C_{02}, C_{12}, C_{22})'$ represents the third row of the orientation matrix. Subsequently, the posteriori state estimation $x_t^+$ and adjusted covariance matrix $P_t^+$ may be determined as follows in equation (13):

$$K_t = P_t^- H^T (H P_t^- H^T + R)^{-1}$$

$$x_t^+ = x_t^- + K_t(z_t - h(x_t^-))$$

$$P_t^+ = (I - K_t H) P_{t-1} \qquad(13)$$

In equation (13), $K_t$ represents the gain matrix of the EKF at the current time instant, H represents the Jacobian matrix at the current time instant, $z_t$ represents the measured data of the acceleration sensor 30 at the current time instant, and $h(x_t^-)$ represents the prediction of the measured data for the current time instant.

In step S311, the micro-processor 21 uses the EKF to adjust the predicted orientation information, which is obtained in step S309, according to the transition matrix F and the magnetic field data generated by the magneto sensor 40. Specifically, the estimation formula is as follows in equation (14):

$$\psi = z_t = h(x_t^-) = \arctan(C_{01}/C_{00}) \qquad(14)$$

In equation (14), $C_{01}$ represents the element in the first row and second column of the orientation matrix, and $C_{00}$ represents the element in the first row and first column of the orientation matrix.

The quaternion obtained from step S311 is the adjusted orientation information which may indicate the real orientation of the mobile device 100 more accurately. In one embodiment, the micro-processor 21 may further transform the quaternion into Euler's angles.

In view of the embodiment of FIG. 3, it will be appreciated that the method of the present application is characterized by using the EKF to predict the orientation of a mobile device and adjusting the predicted orientation based on the measured data of the acceleration sensor and the magneto sensor. Advantageously, the method of the present application may achieve a more accurate prediction of the orientation of a mobile device, in contrast to the conventional design which relies on the gyroscope sensor for orientation prediction, which inevitably causes a larger scale of error as time progresses.

While the application has been described by way of example and in terms of preferred embodiment, it should be understood that the application cannot be limited thereto. Those who are skilled in this technology can still make various alterations and modifications without departing from the scope and spirit of this application. Therefore, the scope of the present application shall be defined and protected by the following claims and their equivalents.

What is claimed is:

1. A mobile device, comprising:
an acceleration sensor, configured to generate acceleration data;
a magneto sensor, configured to generate magnetic field data;
a gyroscope sensor, configured to generate angular velocity data; and
a processor, configured to determine a pitch angle and a roll angle according to the acceleration data generated by the acceleration sensor, determine a yaw angle according to the magnetic field data generated by the magneto sensor, determine a quaternion according to the pitch angle, the roll angle, and the yaw angle, determine orientation information of the mobile device according to the quaternion and the angular velocity data generated by the gyroscope sensor, and adjust the orientation information according to the acceleration data generated by the acceleration sensor and the magnetic field data generated by the magneto sensor.

2. The mobile device as claimed in claim 1, wherein the processor is further configured to determine a state transition matrix of an Extended Kalman Filter (EKF) according to the quaternion and the angular velocity data, and use the EKF to determine the orientation information according to the state transition matrix and the quaternion.

3. The mobile device as claimed in claim 2, wherein the processor is further configured to use the EKF to adjust the orientation information according to the state transition matrix and the acceleration data, and use the EKF to adjust the orientation information according to the state transition matrix and the magnetic field data.

4. The mobile device as claimed in claim 1, wherein the orientation information comprises an estimated quaternion.

5. The mobile device as claimed in claim 4, wherein the processor is further configured to determine Euler angles corresponding to the estimated quaternion.

6. The mobile device as claimed in claim 1, wherein the processor is further configured to use a North-East-Down (NED) coordinate system as a frame of reference for determining the pitch angle, the roll angle, and the yaw angle, and determine a change-of-coordinates matrix between the NED coordinate system and a body frame of the mobile device.

7. The mobile device as claimed in claim 1, wherein the processor is further configured to perform vector normalization on the acceleration data, prior to determining the pitch angle and the roll angle.

8. The mobile device as claimed in claim 1, wherein the processor is further configured to perform vector normalization on the quaternion, prior to determining the orientation information.

9. A method, executed by a processor of a mobile device to determine orientation information of the mobile device which comprises an acceleration sensor, a magneto sensor, and a gyroscope sensor, the method comprising:
   determining a pitch angle and a roll angle according to acceleration data generated by the acceleration sensor;
   determining a yaw angle according to magnetic field data generated by the magneto sensor;
   determining a quaternion according to the pitch angle, the roll angle, and the yaw angle;
   determining orientation information of the mobile device according to the quaternion and angular velocity data generated by the gyroscope sensor; and
   adjusting the orientation information according to the acceleration data generated by the acceleration sensor and the magnetic field data generated by the magneto sensor.

10. The method as claimed in claim 9, wherein the step of determining the orientation information further comprises:
    determining a state transition matrix of an Extended Kalman Filter (EKF) according to the quaternion and the angular velocity data; and
    using the EKF to determine the orientation information according to the state transition matrix and the quaternion.

11. The method as claimed in claim 10, wherein the step of adjusting the orientation information further comprises:
    using the EKF to adjust the orientation information according to the state transition matrix and the acceleration data; and
    using the EKF to adjust the orientation information according to the state transition matrix and the magnetic field data.

12. The method as claimed in claim 9, wherein the orientation information comprises an estimated quaternion.

13. The method as claimed in claim 12, further comprising:
    determining Euler angles corresponding to the estimated quaternion.

14. The method as claimed in claim 9, further comprising:
    using a North-East-Down (NED) coordinate system as a frame of reference for determining the pitch angle, the roll angle, and the yaw angle; and
    determining a change-of-coordinates matrix between the NED coordinate system and a body frame of the mobile device.

15. The method as claimed in claim 9, further comprising:
    performing vector normalization on the acceleration data, prior to determining the pitch angle and the roll angle.

16. The method as claimed in claim 9, further comprising:
    performing vector normalization on the quaternion, prior to determining the orientation information.

* * * * *